United States Patent [19]
Yoshida et al.

[11] Patent Number: 4,667,289
[45] Date of Patent: May 19, 1987

[54] BATTERY-POWERED COMPUTER INTERFACE WITH MANUAL AND AUTOMATIC BATTERY DISCONNECT CIRCUIT

[75] Inventors: Hidetaka Yoshida, Kashihara; Isamu Haneda, Nara, both of Japan

[73] Assignee: Sharp Kabushiki Kaisha, Osaka, Japan

[21] Appl. No.: 534,297

[22] Filed: Sep. 21, 1983

[30] Foreign Application Priority Data

Sep. 24, 1982 [JP] Japan ................... 57-166856

[51] Int. Cl.[4] ............................................... G06F 1/00
[52] U.S. Cl. ..................... 364/200; 364/707; 307/10 BP
[58] Field of Search ............... 364/200 MS, 900 MS, 364/707; 371/66; 307/39, 10 BP, 86; 340/636, 663

[56] References Cited
U.S. PATENT DOCUMENTS

| 4,051,326 | 9/1977 | Badagnani et al. | 364/900 |
| 4,089,062 | 5/1978 | McElroy et al. | 364/900 |
| 4,380,802 | 4/1983 | Segar et al. | 364/900 |
| 4,399,538 | 8/1983 | Cholakian et al. | 371/66 |
| 4,438,431 | 3/1984 | Toyomura | 371/66 |
| 4,463,646 | 8/1984 | Mitarai | 364/707 |
| 4,521,678 | 6/1985 | Winter | 340/663 |
| 4,581,571 | 4/1986 | Hansen | 307/10 BP |

FOREIGN PATENT DOCUMENTS 2082811 3/1982 United Kingdom .

OTHER PUBLICATIONS

R. T. Coffin and A. L. Talkington, "Power System-/Operating System Communications", IBM, Tech. Discl. Bulletin, vol. 22, No. 8B, Jan. '80.

Primary Examiner—David Y. Eng
Assistant Examiner—Florin Munteanu
Attorney, Agent, or Firm—Birch, Stewart, Kolasch & Birch

[57] ABSTRACT

An interface circuit connects a computer and peripheral units. The interface circuit includes a battery power source that drives a signal conversion circuit. A detector circuit detects levels of signals received from the computer, the signals being indicative of a power ON/-OFF status of the computer. A control circuit controls the operation of the signal conversion circuit so that the built-in battery source will not be dissipated while the computer is not in operation. The control circuit also inhibits operation of the signal conversion circuit when the detector circuit indicates that condition of the battery source has deteriorated.

4 Claims, 3 Drawing Figures

BATTERY-POWERED COMPUTER INTERFACE WITH MANUAL AND AUTOMATIC BATTERY DISCONNECT CIRCUIT

BACKGROUND OF THE INVENTION

The present invention relates to an interface circuit that connects a computer and peripheral units, more particularly, to the power control means for said interface circuit.

Generally, an interface circuit is used for connecting a computer, for example, a personal computer, and peripheral equipment, for example, a CRT display. Such an interface circuit has a plurality of signal paths for connecting two units for either transmitting or receiving signals and has signal path control circuits. In such a case, the interface circuit may be built into the computer unit.

Conventionally, if a computer, for example, a portable computer, is driven by a battery which concurrently drives an interface circuit, the battery capacity should be expanded, thus requiring a battery unit of greater dimension. Since existing interface units usually contain both the signal converter and oscillator circuits that consume much power during operation, the computer and interface units are usually independently driven by their own battery.

Such a system, however, still has a problem to solve. When the computer and interface units are independently driven, each having their own battery since the operator may occassionally forget to turn the power off from the interface, the battery power may be dissipated without effect in the interface unit.

SUMMARY OF THE INVENTION

The present invention primarily aims at minimizing unwanted consumption of the battery power that can be caused by the operator's carelessness in forgetting to turn the power off for the interface circuit. A still further object of the present invention is to automatically warn the computer of either a lowered battery voltage, or an inoperative condition of the interface circuit, for example, caused by turning the switch OFF.

The present invention provides a preferred embodiment of an interface circuit that connects a computer and peripheral units, where said interface circuit comprises a battery power source, a detector circuit comprises a level of signals being fed from said computer, and means for controlling the operation of the signal conversion circuit driven by said battery power source in responding to the output from said detector circuit. Preferred embodiments of the present invention provide advantages in that unwanted dissipation of the built-in battery power source that may be caused by the operator's carelessness in forgetting to turn the power off from the interface circuit can be prevented, and at the same time, the existing condition of the battery in the interface circuit, for example, a lowered voltage and the power ON/OFF condition, can also be confirmed.

DETAILED DESCRIPTION OF THE INVENTION

Figure 1:
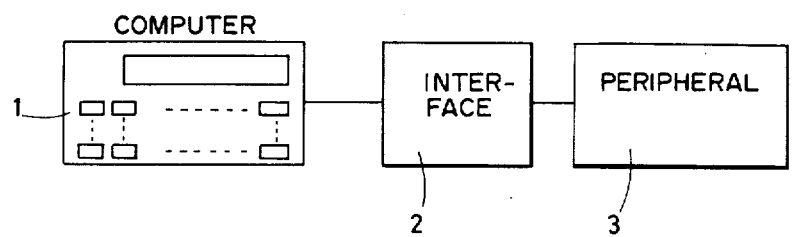
FIG. 1 shows a typical example in which a computer and a peripheral unit are connected via an interface.
Figure 2:
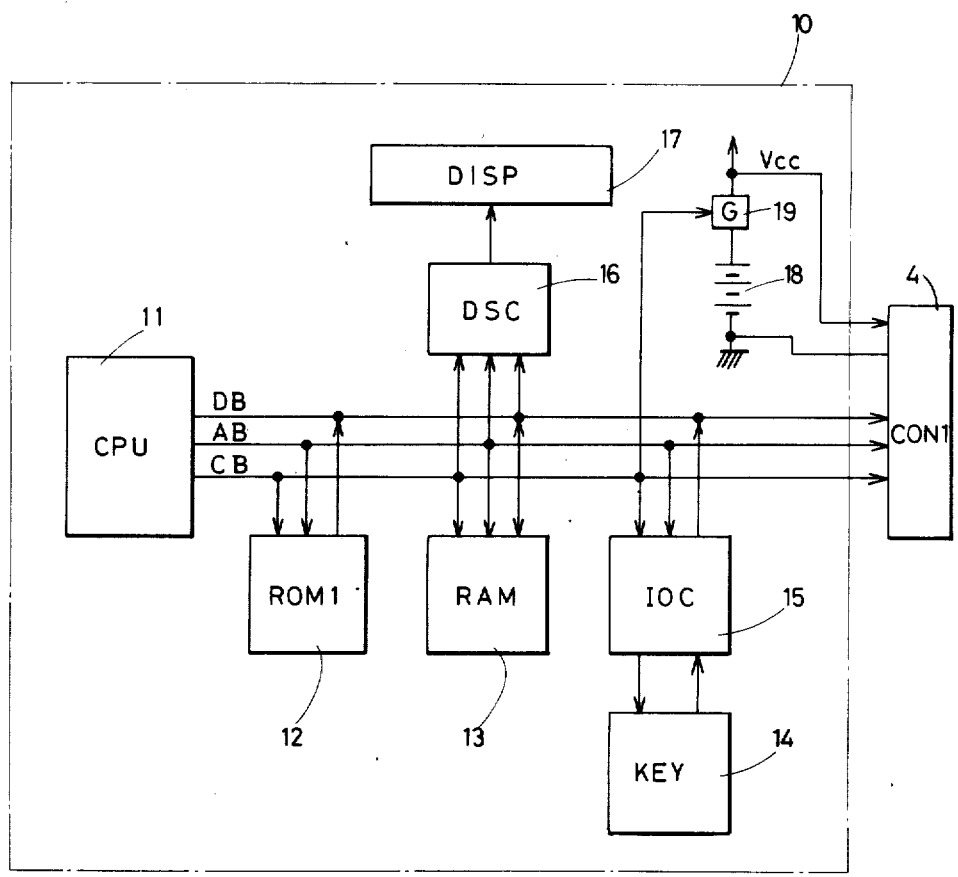
FIG. 2 shows a simplified block diagram of system composition in a computer.

FIG. 1 shows a block diagram of a conventional computer system. Symbol 1 denotes a computer unit, for example, either a pocketable or portable computer, or a personal computer. Symbol 2 denotes an interface connecting said computer unit 1 and an external peripheral unit 3. Said peripheral unit 3 comprises, for example, a CRT display, a printer, or an audio cassette recorder that can be externally connected. FIG. 2 shows a block diagram of an example of a system circuit built in a computer unit 1. Symbol 10 denotes a computer block. Symbol 11 denotes the central processing unit (CPU). Symbol 12 denotes a read-only memory (ROM) storing either the basic interpreters or other control programs. Symbol 13 denotes a random access memory (RAM) that reads and writes data used for basic programming and functions as a system area. Symbol 14 denotes a key input unit. Symbol 15 denotes a control circuit reading the input condition of said key input unit 14. Symbol 16 denotes a display buffer memory controlling the display operation performed by display unit 17 by writing bit patterns corresponding to display patterns into said memory. CPU 11, ROM 12, RAM 13, key input unit 14, and the control circuit 15 are connected to each other via data bus DB, address bus AB, and the control bus CB. Symbol 4 denotes a connector which is connected to a connector 5 of the interface unit. Symbol 18 denotes a battery that generates power source VCC. Said connector 4 of the computer unit and the other connector 5 of the interface unit at least connects said power source VCC to signals flowing through data bus DA, address bus AB, and the control bus CB. Battery 18 is built in the computer unit 1, supplying power to the computer unit 1. However, if the interface unit 2 is connected, it is then included in the interface so that the power can be fed to block 23 (see FIG. 3) which is controlled by the CPU 11 of the computer unit 1. Symbol 19 denotes the power supply control gate, which is controlled by control signals fed from the CPU 11.

Figure 3:
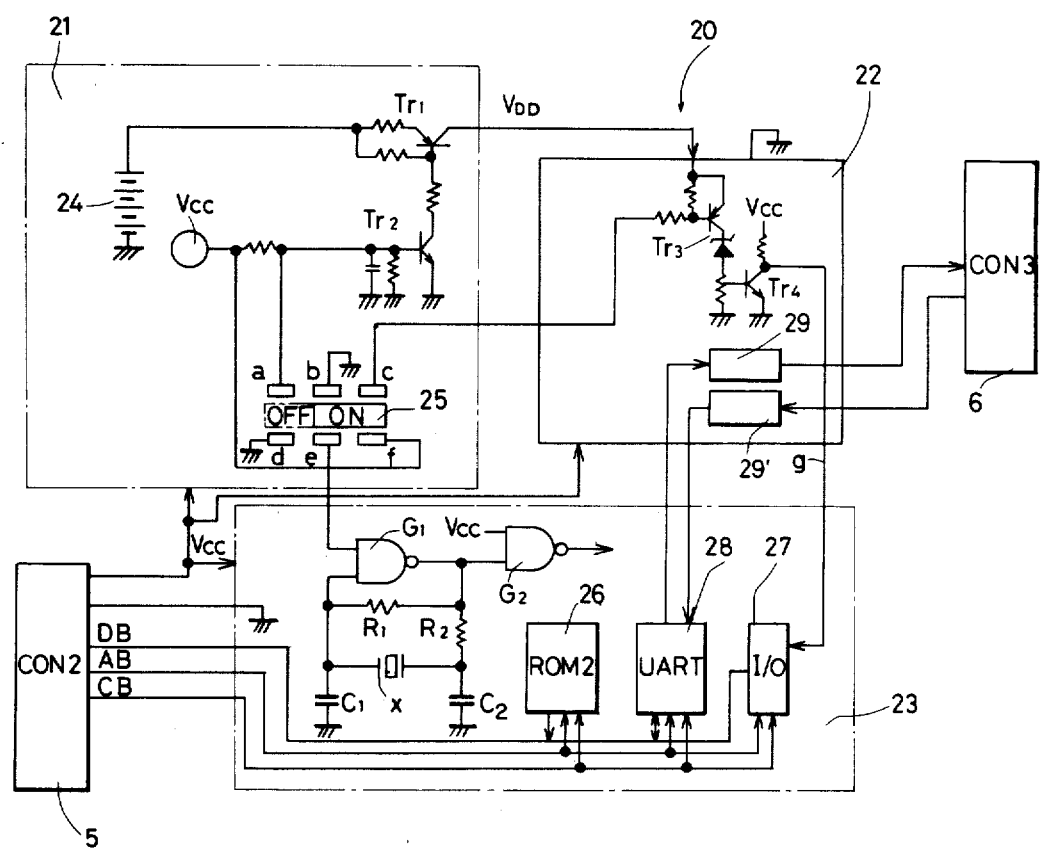
FIG. 3 shows an internal system construction of the interface circuit as a preferred embodiment of the present invention.

FIG. 3 shows a detailed circuit built in the interface 2 shown in FIG. 1. Interface circuit 20 comprises a battery power source 24, a power switch 25 activating the interface unit 2, block 21 that contains a circuit detecting the level of signal fed from the computer 1, block 22 that contains a signal conversion circuit that is driven by the battery power source 24 in response to the output from the signal level detection circuit, an oscillation circuit and a control circuit built in block 23.

Next, operations of respective blocks are described below. Block 21 contains a battery 24. The power source from the computer (denoted by VCC) to be fed from the computer unit 1 becomes VCC while the power of the computer is on and GND level when the power of the computer is OFF. Symbol 25 denotes a power control switch. When it is turned ON, positions b and c, and e and f respectively connected. When a high VCC level is fed from the computer unit 1, indicating that the computer unit is ON, transistor Tr2 first turns ON, then Tr1 also turns ON by the output from Tr2, and so a VDD voltage from battery 24 is sent via transistor Tr1 to the signal conversion circuit of the ensuing block 22. When the power switch is OFF, positions a and b, and d and e are respectively connected. As a result, when the power switch is OFF, the base of Tr2 goes to the GND level so that both transistors Tr2 and Tr1 remain OFF irrespective of the VCC signal level. Block 22 makes up a signal conversion circuit, in which base of transistor Tr3 is connected to the power source switch 25, whereas the emitter is connected to the collector of the power source control transistor Tr1. Collector of transistor Tr3 is grounded via Zener diode generating reference voltage and a variable resistor. Transistor Tr4 is connected to the terminals of said variable resistor. This means that base of Tr4 is connected to the terminals of said variable resistor, emitter to the GND potential, and collector to the VCC potential, respectively. Thus, when the VDD voltage fed from the internal battery 24 activates Tr3 to cause its collector to store enough output level, Tr4 can also be turned ON, eventually causing Low level (GND level) to appear in the output g of Tr4.

Presence of Low level in the output g of Tr4 indicates that the internal battery 24 still stores a high enough voltage level. If this voltage level is not enough, Tr4 turns OFF, and the output g goes to the VCC (High) level. While the power switch 25 is OFF, both transistors Tr3 and Tr4 remain OFF, where the output g of Tr4 remains High (in the VCC level). Level conversion circuits 29 and 29' will be described later on. Usually, said signal conversion circuit consumes much power in the interface unit. Such a large power consumption can be greatly minimized by properly controlling the operation of the interface circuit in response to the ON/OFF operation of the computer unit 1. Block 23 specifically represents both the oscillation and control circuits built in the interface circuit. Crystal oscillator X, resistors R1 and R2, and capacitors C1 and C2 make up an oscillator. This block mainly consumes power to oscillate the crystal oscillator. Since no oscillation is necessary while the interface is not used, a circuit construction is provided so that the oscillator will stop the oscillation in response to the ON/OFF operation of the power switch. ROM 26 preliminarily stores the programs for controlling the interfacing of signals between the computer 1 and peripheral equipment 3, while ROM is connected to CPU 11 of the computer 1 via the data bus DB, address bus AB, and the control bus CB. As a result, CPU 11 can easily be accessed as with ROM of the computer unit 1. Symbol 27 denotes I/O ports, which transmit external signal conditions including signal g in responding to a request from the address and control buses.

Symbol 28 denotes the parallel/serial conversion circuit, which converts a parallel signal on the data bus DB into a serial signal before sending it to the level conversion circuit 29. Conversely, the parallel/serial conversion circuit converts a serial signal output from the level conversion circuit 29' into a parallel signal before delivering it to the data bus. Level conversion circuit 29 converts a signal to a level needed to drive the peripheral unit 3, whereas the other level conversion circuit 29' converts a signal fed from the peripheral unit 3 to the interface 2, into a level suitable for the parallel/serial conversion circuit 28. Both circuits consume much power, and are respectively driven by the power source VDD. When the computer unit 1 executes either the input/output command against the peripheral unit 3, or the command for setting any mode relevant to execution of said command, the computer accesses ROM 2 (26) storing programs needed to execute these commands before actually executing any program in responding to the activated command. When the computer either transmits any data that should be sent to the peripheral unit 3 to the parallel/serial conversion circuit 28, or reads any data that should be fed from the peripheral unit 3 to the parallel/serial conversion circuit 28, the computer detects the condition of signal g being present in the I/O port 27. Specifically, computer 1 identifies the condition of signal g before either sending or receiving character codes to and from the parallel/serial conversion circuit 28. If signal g is Low, the computer either sends out or receives characters. If signal g is High, the computer inhibits input and output of character codes, and then writes a message "LOW BATTERY" into the display buffer memory 16 (see FIG. 2). As a result, a display "LOW BATTERY" will be made in display 17, and then an error condition will be entered. A program needed for writing this message is preliminarily stored in ROM 2 (26).

The above description has been made covering such a case where the interface circuit is provided independent of the computer unit 1. However, the present invention also has made it possible to apply its embodiment to such an interface that can be built into the computer unit. In the present invention, the power switch available for the embodiment includes external switches and/or electronic circuit switches. The above description introduces display means that enables operators to confirm conditions of either the voltage of the built-in battery or the power switch. Such a display means also includes audio sound, speech, and/or optical means as well.

With the invention being thus described it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. An interface device having a power ON/OFF switch for connecting a computer to peripheral equipment comprising:
   interface control means for controlling a flow of data signals between the computer and the peripheral equipment;
   battery means for powering said interface control means;
   status detection means, connected to said battery means and to a computer power signal terminal, for detecting a signal level of a computer power signal produced at the computer power signal terminal, said status detector means determining from said computer power signal the computer power status, said status detection means being connected to the power ON/OFF switch and also detecting the status of the power ON/OFF switch of the interface device, said status detection means also inhibiting a flow of current from said battery means to said interface control means when said status detection means determines that the computer power is OFF or when said status detection means determines that the power ON/OFF switch is OFF;
   discharge detection means, connected to said battery means, for monitoring a discharge from said battery means to said interface control means, said discharge detection means producing a depleated power signal when said discharge from said battery means falls below a predetermined threshold, said discharge detection means transmitting said depleted power signal to the computer through said interface control means and the computer inhibiting, the flow of data between the computer and the peripheral equipment in response to said depleted power signal.

2. The interface device of claim 1, wherein said interface control means includes, parallel/serial conversion means for converting a first parallel signal from the computer into a first serial signal, first level conversion means for adjusting said first serial signal to a level appropriate for transmission to the peripheral equipment, second level conversion means for receiving a second serial signal from the peripheral equipment and adjusting said second serial signal to a level appropriate for receipt by said parallel/serial conversion means, said parallel/serial conversion means converting said second serial signal into a second parallel signal that is transmitted to the computer.

3. The interface device of claim 2 wherein said interface control means further includes a memory in which is stored programs for controlling the flow of data signals between the computer and the peripheral equipment.

4. The interface device of claim 3 wherein said interface control means further includes input/output means for providing an interconnection between the computer and said interface control means that provides a pathway for the flow of data between the computer and said interface control means, said input/output means outputting said depleted power signal from said discharge detection means to the computer.

* * * * *